Sept. 13, 1938.    H. YAGODA    2,129,754
TEST PAPER
Filed Aug. 12, 1937
BEST AVAILABLE COPY
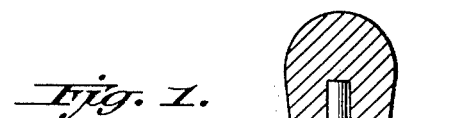
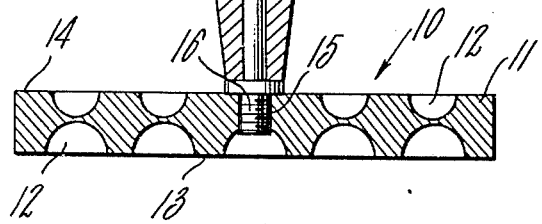
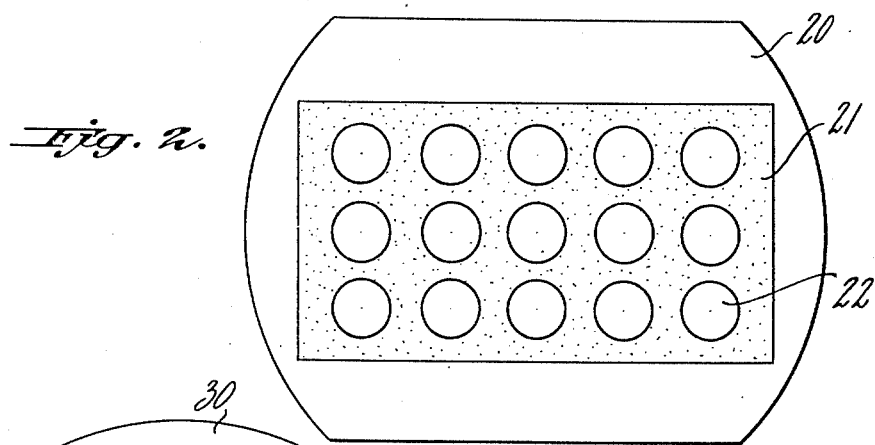
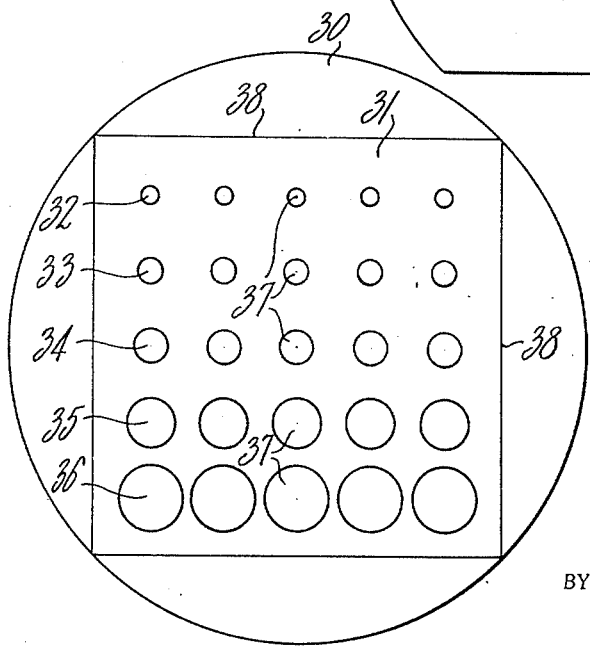
INVENTOR.
HERMAN YAGODA
BY Charles J. Holland
ATTORNEY.

Patented Sept. 13, 1938

2,129,754

UNITED STATES PATENT OFFICE 2,129,754

TEST PAPER

Herman Yagoda, New York, N. Y., assignor to Carl Schleicher & Schüll Co., Inc., New York, N. Y., a corporation of Delaware Application August 12, 1937, Serial No. 158,755

7 Claims. (Cl. 23—253)

This invention relates to the art of chemical analysis and has for an object the provision of a special type and form of paper for use in analytical chemistry, and serving as an indicator for one or more of the constituents of chemical compounds. While the novel paper of the invention is applicable to qualitative analysis, the same may be utilized to approximate quantitative measurements.

Spot tests are well known in the art as a means of identifying one or more constituents of an unknown solution. In general, the test consists in applying a drop of such solution to a specially prepared paper, usually one of a number comprising the class called "filter papers" which has been impregnated with a reagent which reacts with the particular constituent for which the test is designed. The presence of such constituent is manifested by the formation of an irregular colored area or a series of colored zones on the paper.

It has heretofore been difficult to carry out such tests with precision and exactness for the reason that the papers generally available for this purpose are quite porous, and this causes the spot to spread over a large surface. This decreases the sensitivity of the test and renders difficult the determination of color intensity.

By the present invention I confine the spot to a definite area and distribute the reaction product uniformly thereon. I thus enhance the accuracy and sensitivity of the test and concentrate the color or tint produced by the reaction. Moreover, I have found that as a result of the uniformity both in the area and tint of the spot, it is possible to approximate the concentration of the ions of certain elements from the intensity of coloration produced by the drop of solution on the area of the spot.

Briefly described, the invention comprises printing or otherwise applying to a test paper a predetermined area or background, repellent to or immiscible with the solution desired to be tested, which surrounds certain other predetermined areas, preferably of uniform size, which are untreated. The treated areas thus provide a barrier through which the solutions to be tested cannot pass. If the said solutions are aqueous, the barrier must be water-repellent; if they are alcoholic, ethereal, etc., the barrier or background must be such as to repel or remain undissolved in alcohol, ether or such other solvent as is used in any given case.

In the drawing, which are illustrative of one way in which novel test papers of the invention may be made, Fig. 1 is a section of one type of instrument with which the background or barrier for a series of absorbent areas or spots may be applied; Fig. 2 is a plan view of a paper to which the same has been applied; and Fig. 3 is a plan view of another form of test paper treated in accordance with the principles outlined herein.

In Fig. 1 the tool 10 is preferably constructed of a brass or aluminum plate 11 having holes 12 drilled therein and having its surfaces 13 and 14 polished. Opening 15 may be threaded, as shown, for the reception of shank 16 of handle 17 of wood or other suitable material.

In Fig. 2 is illustrated a standard filter paper 20 provided with a background or barrier 21 of paraffin or other suitable material, surrounding zones 22 of uniform size, with which the spot tests are confined. The configuration shown is that provided by printing with the tool of Fig. 1. It will be obvious that the spots 22, illustrated as circular, may be any desired size or shape.

Fig. 3 illustrates another form of treated filter paper in which the paper 30 is of circular configuration circumscribing a square 31 which serves as the background and which is provided with rows 32, 33, etc., of untreated zones 37, each row being of different size. By folding the paper along the edges 38 of the square, the segment-shaped sides form a support for the region containing the absorbing spots or zones. When so folded, the paper of Fig. 3 resembles a porcelain drop plate.

While I prefer to use paraffin to form a background for papers to be used in testing aqueous solutions, I may use other types of waxes or such substances as resins and cellulose esters. The particular protective medium will, of course, be selected in accordance with the requirements indicated by a given problem.

In applying the background to the filter paper, which for qualitative analysis is generally of readily absorbent texture, and for quantitative analysis should be as smooth as possible, I may warm the tool and bring it in contact with a slab of paraffin and then apply the tool to the paper. It is expedient, however, when a series of spots are to be circumscribed, to immerse a thin sheet of absorbent tissue paper in a bath of liquid, drain, cool and lay the waxed sheet over the paper to be inscribed. By momentarily pressing the hot edge of the tool to the waxed tissue, the background is printed and a paper produced having the appearance of Fig. 2.

In some cases I have found it desirable to print the confining barrier with water-repellent inks in order to secure a color background which will not reflect light, and which will aid in colorimetric examination of the samples contained in the confined areas. In other cases I dust powdered waxes or resins on an inked background while the ink is still wet, and remove excess powder when the ink is dry, and subsequently heat the paper thus treated in order to melt the wax and cause it to absorb into the paper.

The reagents, with solutions of which the paper is impregnated, may be applied in various ways, depending on the various factors indicated by the treatment of a given case. For instance, where it is desired to maintain maximum uniformity of impregnation, the entire sheet may be steeped in the desired solution and then dried prior to the formation of the barrier outline. Again, where the accurate determination of the amount of reagent deposited within given areas is the desideratum, a definite volume of the solution is dropped on each of the confined areas of a sheet to which the barrier outline has already been transferred, and the solution subsequently evaporated to dryness. In any event, however, it is desirable that the amount of reagent deposited within the absorbent areas of the paper should be in sufficient excess of that quantity necessary to complete the reaction with the substance in the drop taken for analysis.

It will be understood that qualitative analyses are with the present invention carried out substantially by standard procedure in that a drop of the unknown solution is placed on one or more of the exposed areas of the filter paper and the same observed for manifestations of color changes. As has been indicated, the invention greatly increases the sensitivity with which these determinations may be made.

The novel test papers of the invention may also be used to obtain rapid approximations of the concentration of ions in a solution, by careful comparison of the colors manifested by solutions of known strength with those obtained from the unknown solution.

I have found, for instance, that the metal content of nickel and copper salts can thereby be obtained with an accuracy of within 1 to 3%. In some cases it may be desirable to print on the test paper a set of color standards, so as to simplify the operations necessary for a complete analysis.

It will be observed that test papers constructed in accordance with the principles of the invention are susceptible for use in many ways, other than those described herein, such as the determination of the end points of certain volumetric processes that necessitate the use of external indicators, and even in the analysis of gases. In the latter case the paper is interposed at right angles to the stream of gas, by means of a suitable joint, and the detection and estimation of a given constituent of the gas is effected by the formation of a colored spot within the confined area of the reagent paper. Decreasing the area of the confined region greatly increases the sensitivity of the reaction, particularly in cases where the test sample is a liquid.

What I claim is:

1. A device for chemically analyzing aqueous solutions consisting of a sheet of absorbent paper, a waxy material repellent to such solutions disposed in and upon said paper and circumscribing spots of predetermined limited area and an indicator associated with said spots.

2. A device for chemical analysis consisting of a sheet of absorbent paper, a waxy or resinous material disposed over predetermined areas of said sheet and circumscribing certain limited areas to form spots, and an indicator incorporated within said spots.

3. A device for chemically analyzing a fluid consisting of an absorbent paper coated and impregnated with a material immiscible with the said fluid and having enclosed spaces of predetermined and limited area untreated with said material, said enclosed spaces containing an indicator responsive by color changes to the presence of one of the constituents of said fluid.

4. A device for chemically analyzing a fluid consisting of an absorbent paper having predetermined areas defined and entirely confined by material, incorporated with said paper, repellent to and immiscible with the said fluid, said areas having an indicator for one constituent of said fluid associated therewith.

5. A device for chemically analyzing a fluid consisting of an absorbent paper having predetermined portions thereof coated and impregnated with a material repellent to such fluid, said portions surrounding and enclosing limited areas adapted to retain the solid constituents of a predetermined volume of a solution of an indicator, and thereby confine the indicating reaction within such limited areas.

6. A device for chemically analyzing a fluid consisting of an absorbent paper having predetermined portions thereof coated and impregnated with a coloring material repellent to such fluid, said portions circumscribing predetermined spots, said spots being impregnated with an indicator responsive by color changes to the presence of one of the constituents of said fluid.

7. A testing device comprising a sheet of absorbent paper, and a waxy material repellent to chemical solutions disposed in and upon said paper and circumscribing spots of predetermined limited area.

HERMAN YAGODA.